United States Patent
Weaver

(10) Patent No.: US 9,963,348 B2
(45) Date of Patent: May 8, 2018

(54) HIGH PRESSURE JETS FOR LEACHING CATALYSTS FROM A POLYCRYSTALLINE DIAMOND COMPACT

(71) Applicant: Halliburton Energy Services, Inc., Houston, TX (US)

(72) Inventor: Gary E. Weaver, Conroe, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 276 days.

(21) Appl. No.: 14/434,520

(22) PCT Filed: Jun. 4, 2014

(86) PCT No.: PCT/US2014/040797
§ 371 (c)(1),
(2) Date: Apr. 9, 2015

(87) PCT Pub. No.: WO2015/187135
PCT Pub. Date: Dec. 10, 2015

(65) Prior Publication Data
US 2016/0289079 A1   Oct. 6, 2016

(51) Int. Cl.
| | | |
|---|---|---|
| B24D 3/00 | (2006.01) | |
| C01B 31/06 | (2006.01) | |
| E21B 10/46 | (2006.01) | |
| B05B 9/00 | (2006.01) | |
| B05B 13/02 | (2006.01) | |
| C01B 32/28 | (2017.01) | |

(Continued)

(52) U.S. Cl.
CPC ............ *C01B 31/065* (2013.01); *B05B 9/002* (2013.01); *B05B 13/0228* (2013.01); *B05B 13/0292* (2013.01); *B05B 14/00* (2018.02); *C01B 32/28* (2017.08); *E21B 10/46* (2013.01); *B22F 7/06* (2013.01); *B22F 2003/244* (2013.01); *B22F 2999/00* (2013.01); *C22C 26/00* (2013.01)

(58) Field of Classification Search
USPC .......................................................... 51/307
See application file for complete search history.

(56) References Cited

U.S. PATENT DOCUMENTS

| 4,288,248 A | 9/1981 | Bovenkerk et al. |
|---|---|---|
| 6,719,611 B2 | 4/2004 | Kordonski et al. |

(Continued)

FOREIGN PATENT DOCUMENTS

| CN | 102844135 A | 12/2012 |
|---|---|---|
| CN | 102933784 A | 2/2013 |

(Continued)

OTHER PUBLICATIONS

Sherwood et al., Mass Transfer, McGraw Hill, New York, 1975, pp. 620-621.

(Continued)

*Primary Examiner* — James E McDonough
(74) *Attorney, Agent, or Firm* — McDermott Will & Emery LLP

(57) ABSTRACT

Apparatuses and methods for leaching catalysts from a polycrystalline diamond compact (PDC) may utilize a high pressure jet. For example, a method may include impinging a jet of leaching fluid, including one or both of an acid and a caustic material, on a surface of a PDC disposed on a substrate at a fluid pressure ranging between 125 psi and 10,000.

18 Claims, 7 Drawing Sheets

(51) Int. Cl.
*B24D 3/02* (2006.01)
*B24D 11/00* (2006.01)
*B24D 18/00* (2006.01)
*C09K 3/14* (2006.01)
*B22F 7/06* (2006.01)
*C22C 26/00* (2006.01)
*B22F 3/24* (2006.01)

(56) References Cited

U.S. PATENT DOCUMENTS

| | | |
|---|---|---|
| 7,757,792 B2 | 7/2010 | Shamburger |
| 8,071,173 B1 | 12/2011 | Sani |
| 8,312,943 B1 | 11/2012 | Miess et al. |
| 8,377,510 B2 | 2/2013 | Lyons et al. |
| 8,435,324 B2 | 5/2013 | Ladi et al. |
| 8,596,387 B1 | 12/2013 | Sani et al. |
| 2007/0169419 A1 | 7/2007 | Davis et al. |
| 2010/0011673 A1 | 1/2010 | Shamburger |
| 2010/0266816 A1 | 10/2010 | Eyre |
| 2010/0300765 A1 | 12/2010 | Zhang et al. |
| 2011/0036641 A1 | 2/2011 | Lyons |
| 2012/0047815 A1 | 3/2012 | Sani |
| 2012/0227332 A1 | 9/2012 | Belnap et al. |
| 2013/0001100 A1 | 1/2013 | Thigpen et al. |
| 2013/0220707 A1 | 8/2013 | Shen et al. |
| 2013/0340352 A1* | 12/2013 | Eve .................. B01J 19/24 51/309 |
| 2014/0007512 A1 | 1/2014 | Belnap et al. |

FOREIGN PATENT DOCUMENTS

| | | |
|---|---|---|
| CN | 103468912 A | 12/2013 |
| CN | 103608544 A | 2/2014 |
| WO | 2012145586 A1 | 10/2012 |
| WO | 2015187135 A1 | 12/2015 |

OTHER PUBLICATIONS

Sieji Shimizu, Tribology in Water Jet Processes, New Tribological Ways, Dr. Taher Ghrib (ed.), ISBN: 978-953-307-206-7, In Tech, Available from http://www.intechopen.com/books/new-tribological-ways/tribologyin-water-jet-processes, 2011.

Schmitt, George F., Technical Report Afml-TR-79/4122; Air Force Materials Laboratory, Liquid and Solid Particle Impact Erosion, 1979.

International Journal of Nonferrous Metallurgy, Factors Research on the Influence of Leaching Rate of Nickel and Cobalt from Waste Superalloys with Sulfuric Acid, 2, 63-67, 2013.

International Search Report and Written Opinion for PCT?US2014/040797 dated Feb. 26, 2015.

Chinese Office Action from Chinese Patent Application No. 201480077239.7, dated May 24, 2017.

Cui et al., "High pressure water jet technology," Coal Industry Press, Oct. 1993, Edition 1, pp. 91, 93-94, 108-109.

Chinese Office Action from Chinese Patent Application No. 201480077239.7, dated Jan. 30, 2018, 13 pages.

* cited by examiner

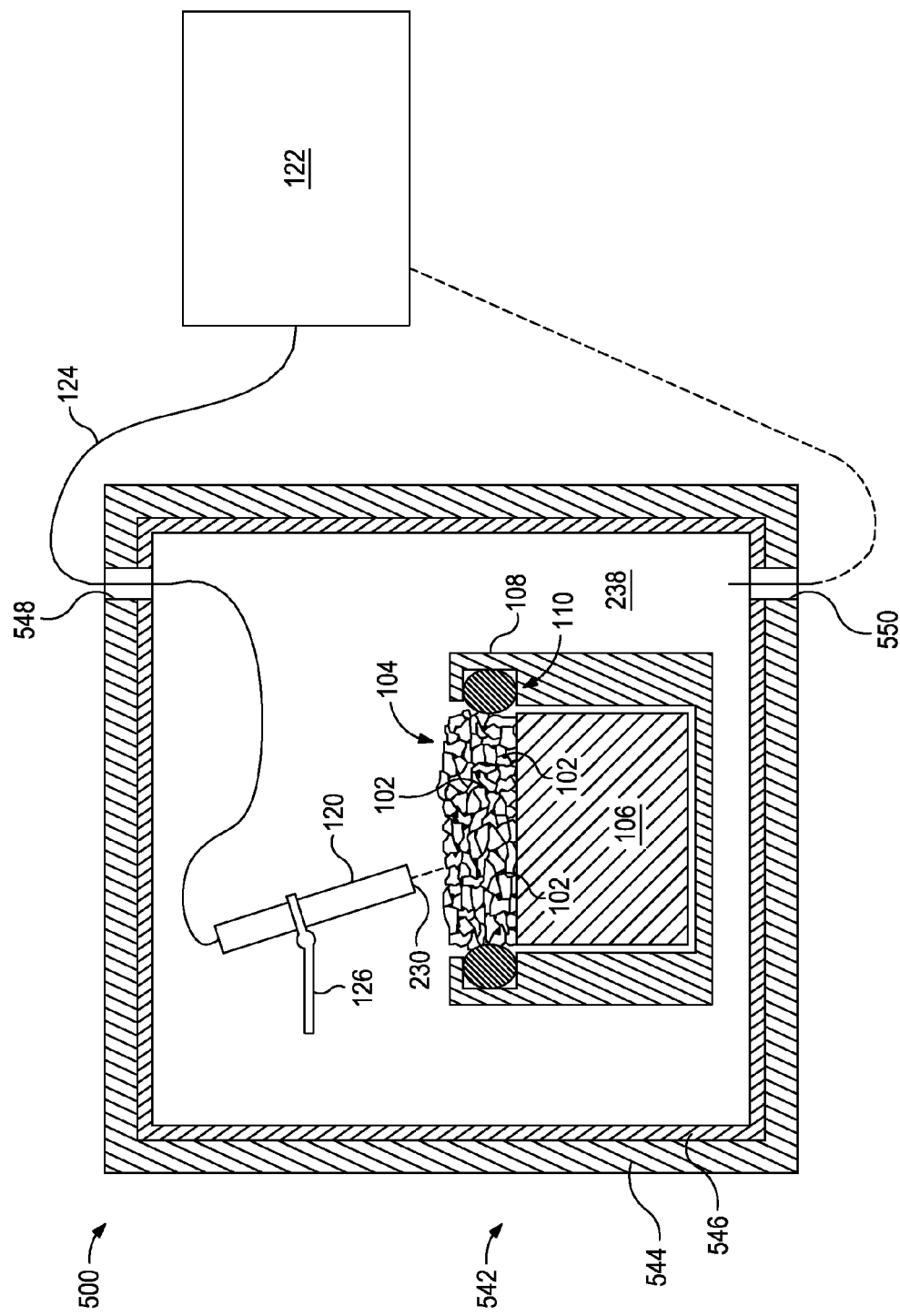

HIGH PRESSURE JETS FOR LEACHING CATALYSTS FROM A POLYCRYSTALLINE DIAMOND COMPACT

BACKGROUND

This application relates to drill bit fabrication.

Various industrial elements (e.g., drill bit cutters) may include one or more polycrystalline diamond compact (PDC). A PDC may, for example, provide very high thermal and abrasion resistance to a fixed cutter or other industrial element, along with other possible benefits. The PDC portion of the element may be formed by subjecting small diamond particles to high temperature and pressure. The PDC may be formed directly on the surface of a substrate, which typically forms the main body of the element. A catalyst (e.g., Fe, Ni, Co, and alloys thereof) may be included with the loose diamond particles and/or may be present in the substrate to migrate out of the substrate at elevated temperature and pressure. Subjecting the diamond particles and substrate to extreme temperature and pressure causes the diamonds to fuse together and form a generally continuous and physically solid matrix, which constitutes the PDC. In this matrix, there are substantial direct diamond-to-diamond bonds. After formation, the catalyst materials remain interspersed in the interstitial spaces of the PDC matrix. As a result of the forming process, the PDC is also bonded to the substrate in such a way that the PDC stays in place on the substrate when the element is in use.

During industrial use of the element, such as when drilling with a fixed cutter drill bit, any catalyst in the interstitial spaces of the PDC may confer detrimental properties to the PDC over time. For example, the catalyst may have a higher coefficient of thermal expansion than diamonds such that, as the PDC element heats up during use, the metal catalyst may expand faster than the diamond matrix. This disproportionate expansion may cause problems such as spalling, delamination, or conversion to graphite, which may limit the lifetime of the PDC.

To increase the mechanical properties and useful lifetime of PDC, some catalyst may be removed from at least a working surface of the PDC. Removal of the catalyst is typically accomplished using either an electrochemical or a chemical process. In chemical processes, commonly referred to as "leaching," the PDC may be soaked in a strong acid or a caustic material to dissolve and remove the catalyst from the interstitial spaces of the PDC. Depending on the desired leaching depth, the soaking processes may take several days to weeks. In some instances, the leaching process may be over a month.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 7 depicts another exemplary apparatus according to at least some embodiments described herein for leaching catalysts from a PDC disposed on a substrate.

DETAILED DESCRIPTION

This application relates to drill bit fabrication and, more particularly, to apparatuses and methods for leaching catalysts from a PDC with a high pressure jet.

The embodiments described herein utilize a high pressure jet of a leaching fluid (e.g., a strong acid or a caustic material) to access a catalyst disposed in the interstitial spaces of a PDC. It is believed that, in some instances, the high pressure jet may access the catalyst at greater depths and in a shorter amount of time as compared to leaching by soaking the PDC.

Figure 1:
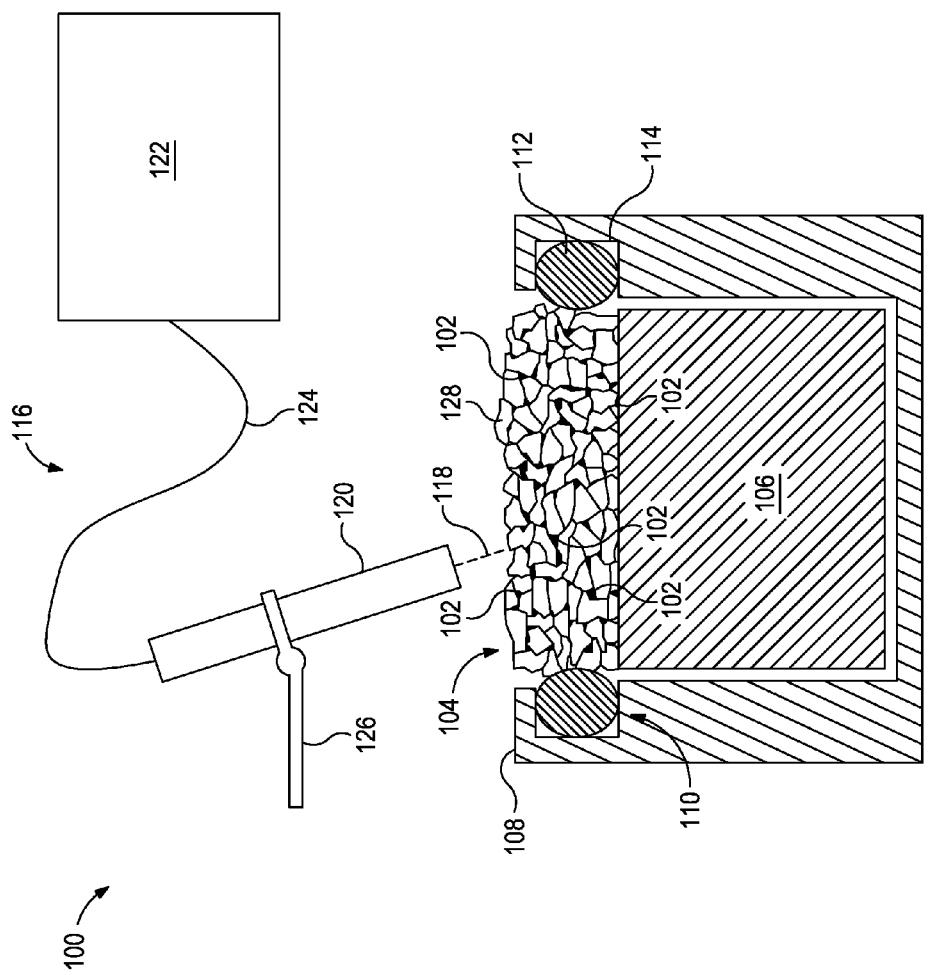
FIG. 1 depicts an exemplary apparatus according to at least some embodiments described herein for leaching catalysts from a PDC disposed on a substrate.

FIG. 1 provides an illustration of an apparatus 100 according to at least some embodiments described herein for leaching catalysts 102 from a PDC 104 disposed on a substrate 106. As illustrated, the apparatus 100 includes a liner 108 dimensioned to receive the substrate 106. A sealing element 110 may be coupled to the liner 108 and configured to fluidly seal the substrate 106 within the liner 108 and expose the PDC 104 to the environment exterior to the liner 108. In some embodiments, as illustrated, the sealing element 110 may be an O-ring 112 disposed within an annular groove 114 defined in the liner 108.

The apparatus 100 may also include a jet system 116 designed to produce a high pressure jet 118 of a leaching fluid directed toward and impinging the PDC 114. The jet system 116 may include a nozzle 120 fluidly coupled to a fluid handling system 122, for example, with a hose 124 or other tubular conduit. The apparatus 100 may also include a positioning element 126 used to position the nozzle 120 relative to an outer surface of the PDC 104. As illustrated, the positioning element 126 is coupled directly to the nozzle 120.

During operation, the fluid pressure produced by the jet 118 may, among other things, causes the leaching fluid ejected out of the nozzle 120 to penetrate the PDC 114 and access, dissolve, and remove the catalyst 102 that may be lodged in between various diamond crystals 128 that constitute the body of the PDC 114. In some embodiments, the fluid pressure generated by the jet 118 (also referred to herein as jet pressure) may range between 125 psi and 10,000 psi, between 500 psi and 5,000 psi, between 500 psi and 1,000 psi, or between 1,000 psi and 5,000 psi, including any pressure ranges that lie therebetween. In some embodiments, the fluid pressure may vary during operation. For example, the surface of the PDC 104 may be initially treated with the jet 118 of leaching fluid at 250 psi to 500 psi followed by a treatment at 1000 psi to 5000 psi. Subsequent treatments may include increased fluid pressures beyond 1000 psi to 5000 psi. In some instances, higher fluid pressures may allow the leaching fluid to penetrate further into the interstitial spaces of the PDC 104 and thereby access the catalysts 102 disposed deeper therein.

During operation, the nozzle 120 (e.g., via the positioning element 126), the liner 108, or both may be moved so that all or a portion of the outer surface of the PDC 104 may be aligned with the jet 118 such that the leaching fluid may impinge upon the outer surface of the PDC 104. This process may be automated or an operator may alternatively adjust the position of one or both of the nozzle 120 and the liner 108 manually.

The sealing element 110 may be configured to hold the substrate 106 and the PDC 104 in place and simultaneously isolate the substrate 106 from an ingress of the leaching fluid. As will be appreciated, this may prove advantageous when the leaching fluid is capable of reacting with and otherwise degrading the substrate 106. For example, a cutter used in drill bits may include a substrate 106 made of tungsten carbide, which is known to react with strong acids, such as those used as leaching fluids. Accordingly, isolating the substrate 106 from the leaching fluid may mitigate degradation of the substrate 106 and damage to the interface between the substrate 106 and the PDC 104.

Figure 2:
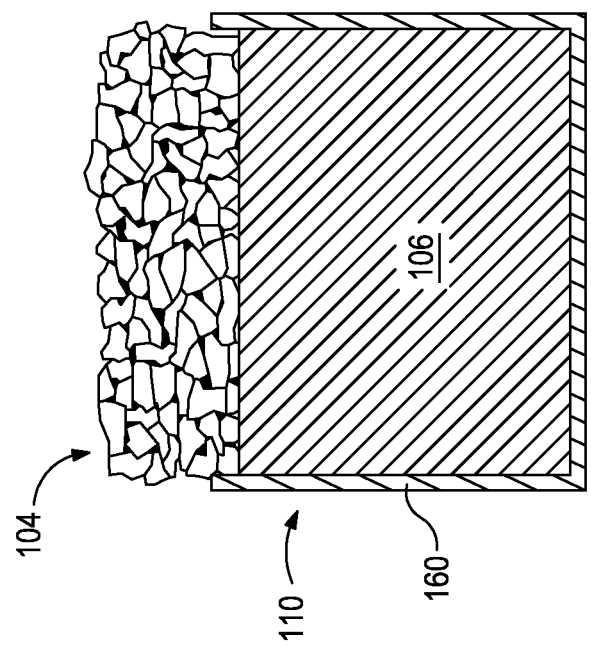
FIG. 2 depicts an exemplary sealing element for a substrate according to at least some embodiments described herein.

FIG. 2, with continued reference to FIG. 1, for example, provides an illustration of a sealing element 110 that includes a barrier layer 160 disposed about the surface of the substrate 106 and a portion of the PDC 104 surface (e.g., a portion of the surface proximal to the interface of the substrate 106 and the PDC 104). Such a barrier layer 160 may be achieved, for example, by dip coating the substrate 106 with a fluoropolymer (e.g., polytetrafluoroethylene (PTFE), known by trade name TEFLON®). Alternatively, barrier layer 160 may be achieved by wrapping the substrate 106 with a TEFLON® tape.

Figure 3:
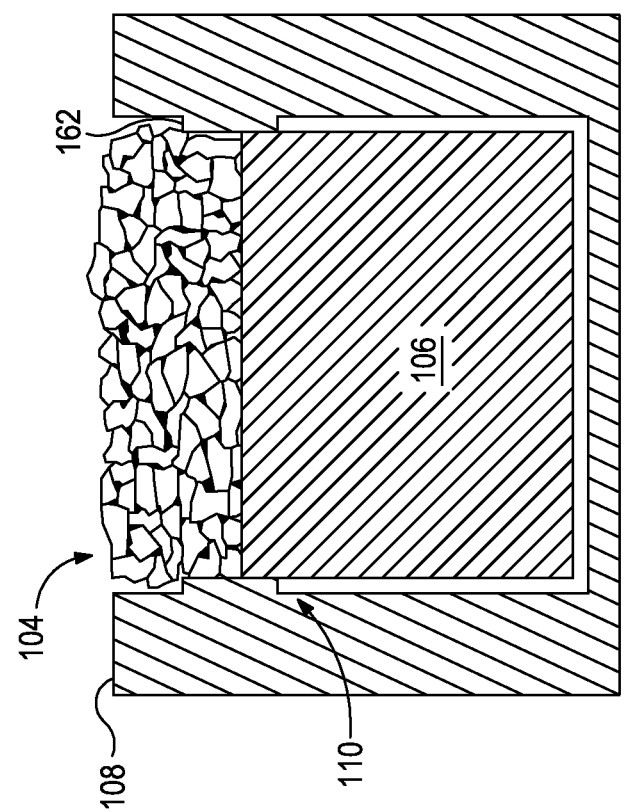
FIG. 3 depicts another exemplary sealing element for a substrate according to at least some embodiments described herein.

FIG. 3, with continued reference to FIG. 1, provides an illustration of yet another example of a sealing element 110 that is formed by an internal upset 162 in the liner 108. The internal upset 162 extends from the liner 108 toward the substrate 106 and forms an interference fit between the liner 108 and the substrate 106 or PDC 104, thereby fluidly sealing the substrate 106 within the liner 108.

Figure 4:
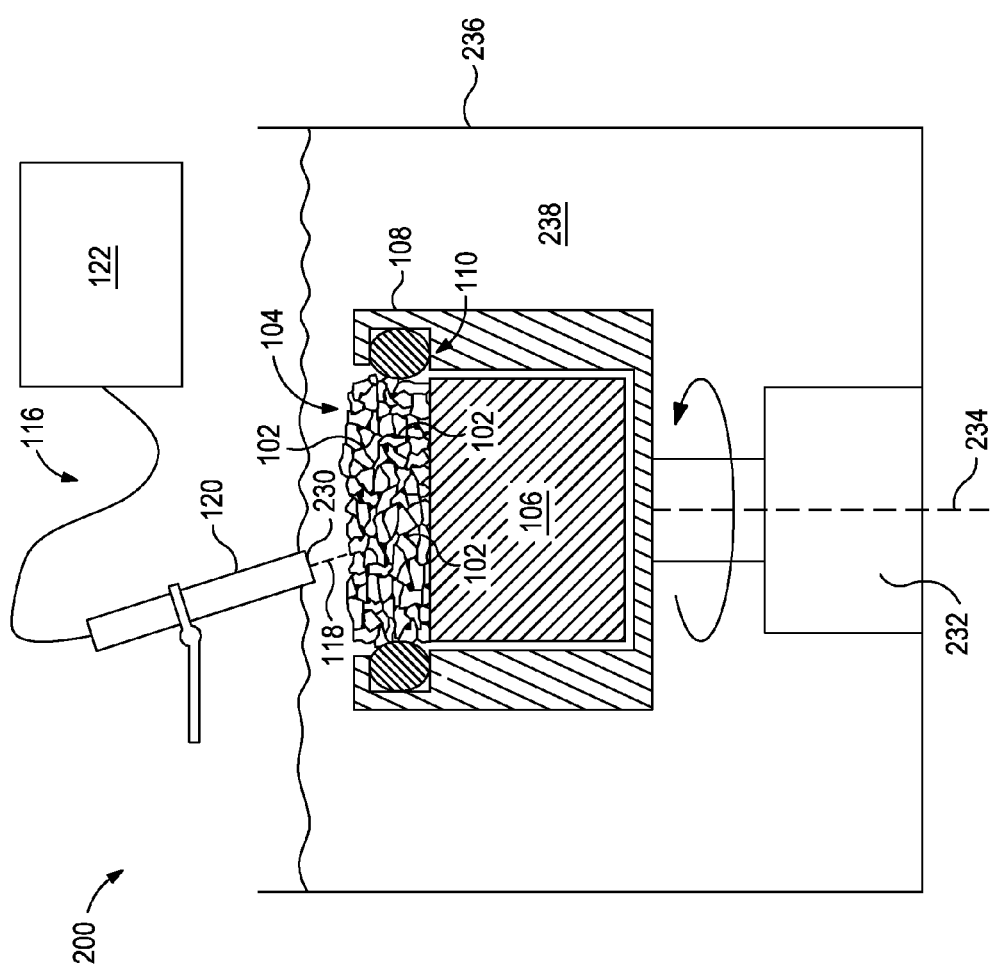
FIG. 4 depicts another exemplary apparatus according to at least some embodiments described herein for leaching catalysts from a PDC disposed on a substrate.

FIG. 4, with continued reference to FIG. 1, provides an illustration of another apparatus 200 according to at least some embodiments described herein for leaching catalysts 102 from a PDC 104 disposed on a substrate 106. Similar to the apparatus 100 of FIG. 1, the apparatus 200 includes the liner 108, the sealing element 110, and the jet system 116.

In the illustrated embodiment, however, the liner 108 may be coupled to a turntable 232 configured to rotate the liner 108 about a central axis 234. As illustrated, the liner 108 and the turntable 232 are contained within a vessel 236 that may be filled at least partially with a fluid 238. As illustrated, the turntable 232 and the liner 108 and its contents (i.e., the PDC 104, the substrate 106, the sealing element 110, etc.) may be disposed within the vessel 236 and entirely submerged within the fluid 238. Submersion of the PDC 104 may allow for a simultaneous treatment of a first portion of the PDC 104 surface with the jet 118 and a second portion of the PDC 104 surface with the fluid 238. Additionally, the jet 118 may cause movement or mixing of the fluid 238 proximal to the second portion of the PDC surface. Such mixing of the fluid 238 may mitigate the formation of a diffusion boundary layer where the concentration of dissolved catalyst in the fluid 238 builds up locally and mitigates dissolution of additional catalyst 102 proximal to the diffusion boundary layer.

In some embodiments, the turntable 232 may be omitted from the apparatus 200, without departing from the scope of the disclosure. In yet other embodiments, the turntable 232 may be included in the apparatus 100 of FIG. 1, and operate as generally described herein in conjunction with the apparatus 100.

In some embodiments, the fluid 238 and the leaching fluid ejected out of the nozzle 120 via the jet 118 may be the same type of fluid. In other embodiments, however, the fluid 238 may be different from the leaching fluid and otherwise constitute another fluid that is compatible with the leaching fluid. For example, if the leaching fluid in the jet 118 is an acid, a caustic fluid may be incompatible with the acid because the two fluids may react to yield excessive heat and precipitate salts and would generally not be used as the fluid 238. While not shown, in at least one embodiment, the vessel 236 may be fluidly coupled to the fluid handling system 122 so that the fluid 238 may be drawn into the fluid handling system 122 and otherwise recycled or used as the leaching fluid for the jet 118.

During exemplary operation, the nozzle 120 may be at least partially introduced into the fluid 238. More particularly, as illustrated, the nozzle 120 may define or otherwise provide a nozzle tip 230 out of which the jet 118 may be ejected. During exemplary operation of the apparatus 200, the nozzle tip 230 may be submerged within the fluid 238. Submersion of the nozzle tip 230 may reduce splashing of the leaching fluid when impinging the PDC 104 surface.

Referring now to both FIGS. 1 and 4, in some embodiments, the jet 118 may impinge the outer surface of the PDC 104 at a speed of 150 ft/s or greater (e.g., 200 ft/s or greater, 300 ft/s or greater, or 500 ft/s or greater). The speed of impingement may depend on the fluid pressure generated by the jet 118, the angle of incidence of the jet 118 relative to the outer surface of the PDC 104, the distance between the nozzle tip 230 and the outer surface of the PDC 104, and the viscosity of the leaching fluid.

In some embodiments, the speed of impingement may further depend on the shape and size of the jet orifice (not shown) defined in the nozzle tip 230 and configured to eject the leaching fluid from the nozzle 120. In some instances, for example, the jet orifice may be circular in shape and therefore configured to yield a columnar jet 118. In other instances, the nozzle tip 230 may be defined in the shape of a slit or the like in order to yield a linear jet 118.

In some instances, the jet orifice may exhibit a known nozzle orifice diameter and the nozzle tip 230 may be configured to be arranged within a predetermined distance from the outer surface of the PDC 104 based on the known nozzle orifice diameter. This may prove advantageous in mitigating pressure loss so that the jet pressure on the PDC 104 is substantially similar to that of the jet pressure at the nozzle tip 230.

In some embodiments, the jet orifice may have a nozzle orifice diameter ranging from 0.5 mm to 5 mm. As used herein, the term "nozzle orifice diameter" refers to the largest cross-sectional diameter of the orifice. In some embodiments, for example, the nozzle tip 230 may be configured to be arranged within twenty nozzle orifice diameters from the outer surface of the PDC 104. In other embodiments, the nozzle tip 230 may be configured to be arranged within ten nozzle orifice diameters from the outer surface of the PDC 104. In yet other embodiments, the nozzle tip 230 may be configured to be arranged within five nozzle orifice diameters of the outer surface of the PDC 104.

Because of the irregular shapes of the diamond crystals 128 and the interstitial spaces therebetween, access of the leaching fluid to the catalyst 102 may be enhanced by angling the jet 118 relative to the PDC 104. Suitable angles of impingement may be between 0° (parallel to the PDC 104) and 90° (perpendicular to the PDC 104). In some embodiments, the angle of impingement for the jet 118 may range between 30° to 80°, 45° to 75°, or 60° to 75°. In some embodiments, the angle of impingement for the jet 118 may vary during operation. For example, the surface of the PDC 104 may be treated with the jet 118 of leaching fluid at an angle of 90° followed by a treatment at an angle of 75°.

Examples of acids suitable for use as leaching fluids for the catalyst 102 may include, but are not limited to, hydrochloric acid, sulfuric acid, nitric acid, aqua regia, ferric chloride solutions, cupric chloride solutions, and any mixture thereof. Examples of caustic materials suitable for use as leaching fluids for the catalyst 102 may include, but are not limited to, sodium hydroxide, potassium hydroxide, and any mixture thereof.

In some embodiments, the leaching fluid may have a viscosity at room temperature of 0.5 cP to 20 cP, including any subset therebetween (e.g., 1 cP to 15 cP, 2 cP to 10 cP, etc.). In some instances, lower viscosities may provide for greater infiltration into the PDC 104 so as to access more catalyst 102.

Generally, the liner 108, the sealing element 110, and the jet system 116 or components thereof should be made of materials suitable for contact with the leaching fluids. For example, fluoropolymers (e.g., PTFE, known by trade name TEFLON®) may be used to make or coat components of the liner 108, the sealing element 110, and the jet system 116. Additionally, where suitable, some components may need to be able to also withstand high pressures. For example, the nozzle tip 230 and/or the jet orifice may need to be made of a ceramic, glass, or diamond to be compatible with the leaching fluids and the high fluid pressure generated at the jet orifice. In some instances, if the pressures are sufficiently low, the nozzle tip 230 and/or the jet orifice may be made of a metal or other strong material coated with PTFE or another fluoropolymer. In some instances, the fluoropolymer may be filled or doped with fibers to increase the strength of the fluoropolymer. Exemplary fibers may include, but are not limited to, carbon fibers, glass fibers, ceramic fibers, and the like.

In some embodiments, the jet system 116 may include a heater to heat the leaching fluid, which may further enhance dissolution of the catalyst 102. The temperature of the leaching fluid exiting the nozzle tip 230 may, in some embodiments, be between room temperature and the boiling point of the leaching fluid.

The jet system 116 may, in some embodiments, include a fluid handling system that allows for changing the leaching fluid composition during operation. For example, the leaching fluid may be a mixture of hydrochloric acid and nitric acid, and the fluid handling system may be useful in changing the relative concentrations of these acids during operation. In another example, the leaching fluid may be changed from 30% hydrochloric acid in water to 10% hydrochloric acid in water, which may allow for increasing the temperature of the leaching fluid as the boiling point for 30% hydrochloric acid is 90° C. and the boiling point for 10% hydrochloric acid is 103° C. In yet another example, the leaching fluid may be changed from hydrochloric acid to nitric acid gradually (i.e., through a series of mixtures of the two) or abruptly. In some instances, a jet system 116 that allows for changing fluids may be useful in instances where the PDC 104 includes other impurities like tungsten carbide, where different acids may be suitable for the removing catalysts 102 and other impurities. For example, hydrofluoric acid may be useful in removing impurities like tungsten carbide, while aqua regia or nitric acid may be useful in removing catalysts 102.

In some embodiments, the nozzle 120 may be suitable for producing cavitation within the jet 118. Cavitation may enhance the dissolution of the catalyst 102 by way of cavitation occurrences proximal to the catalyst 102 providing mechanical agitation of the catalyst and increased local heating, which may enhance dissolution of the catalyst 102.

Figure 5:
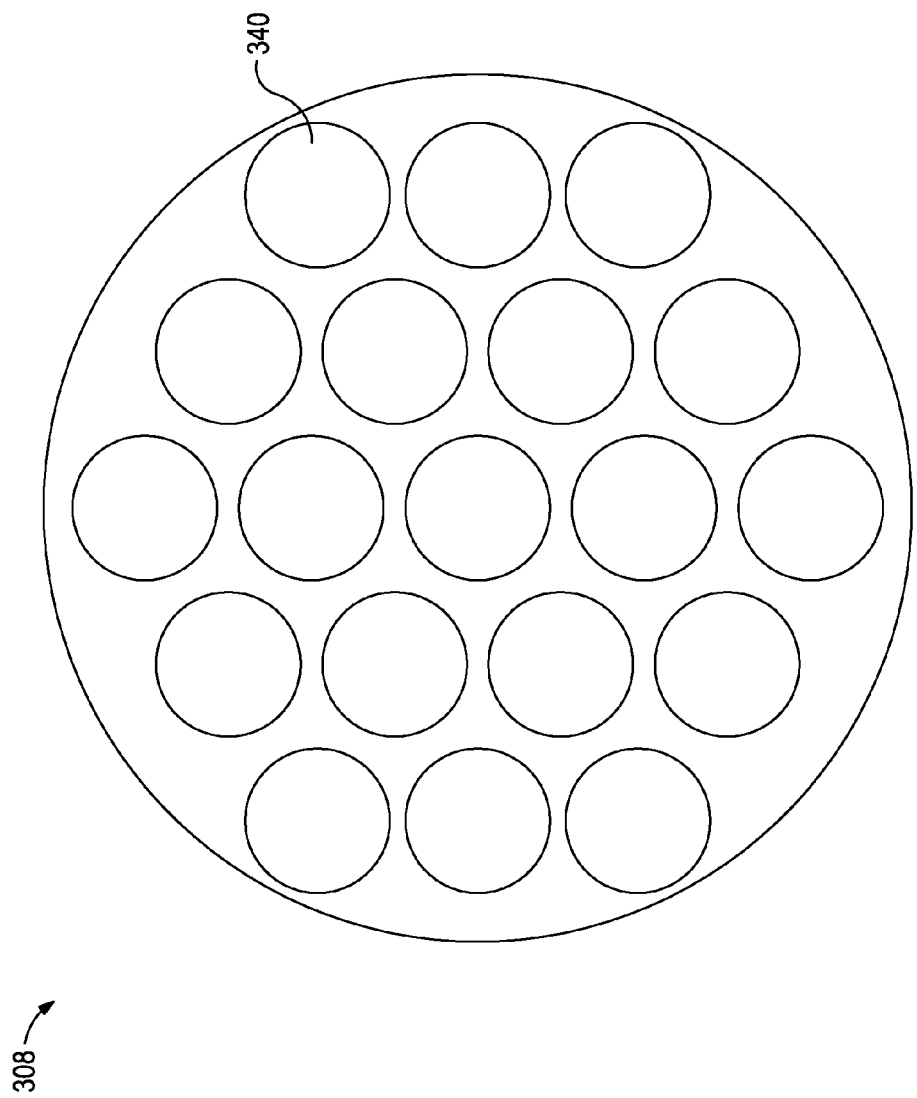
FIG. 5 provides a top view of a liner according to at least some embodiments described herein with multiple slots for holding and treating substrates with PDC disposed thereon.

Referring now to FIG. 5, with continued reference to the prior figures, illustrated is a top view of a liner 308 that may be used in conjunction with the apparatuses 100, 200 of FIGS. 1 and 4, respectively, according to at least some embodiments. More particularly, the liner 308 may include or otherwise define multiple slots 340 configured to hold a corresponding number of substrates 106 (FIGS. 1-4) with PDC 104 (FIGS. 1-4) disposed thereon for a leaching treatment. In some embodiments, as illustrated, the liner 308 may be generally circular. In other embodiments, however, the liner 308 may exhibit any other shape, such as ovular or polygonal (e.g., square, hexagonal, etc.).

While FIG. 5 depicts nineteen slots 340, it will be appreciated that any number of slots 340 may be used in the liner 308, without departing from the scope of the disclosure. Moreover, while the slots 340 are depicted in FIG. 5 as arranged in a hexagonal close-packed configuration, they could equally be arranged in any other patterned configuration. While the slots 340 are circularly shaped (e.g., for receiving cutters for use in forming drill-bits), the slots 340 may alternatively be shaped to receive the substrate of interest, which may have any cross-sectional shape including, but not limited to, polygonal, ovular, and the like.

Figure 6:
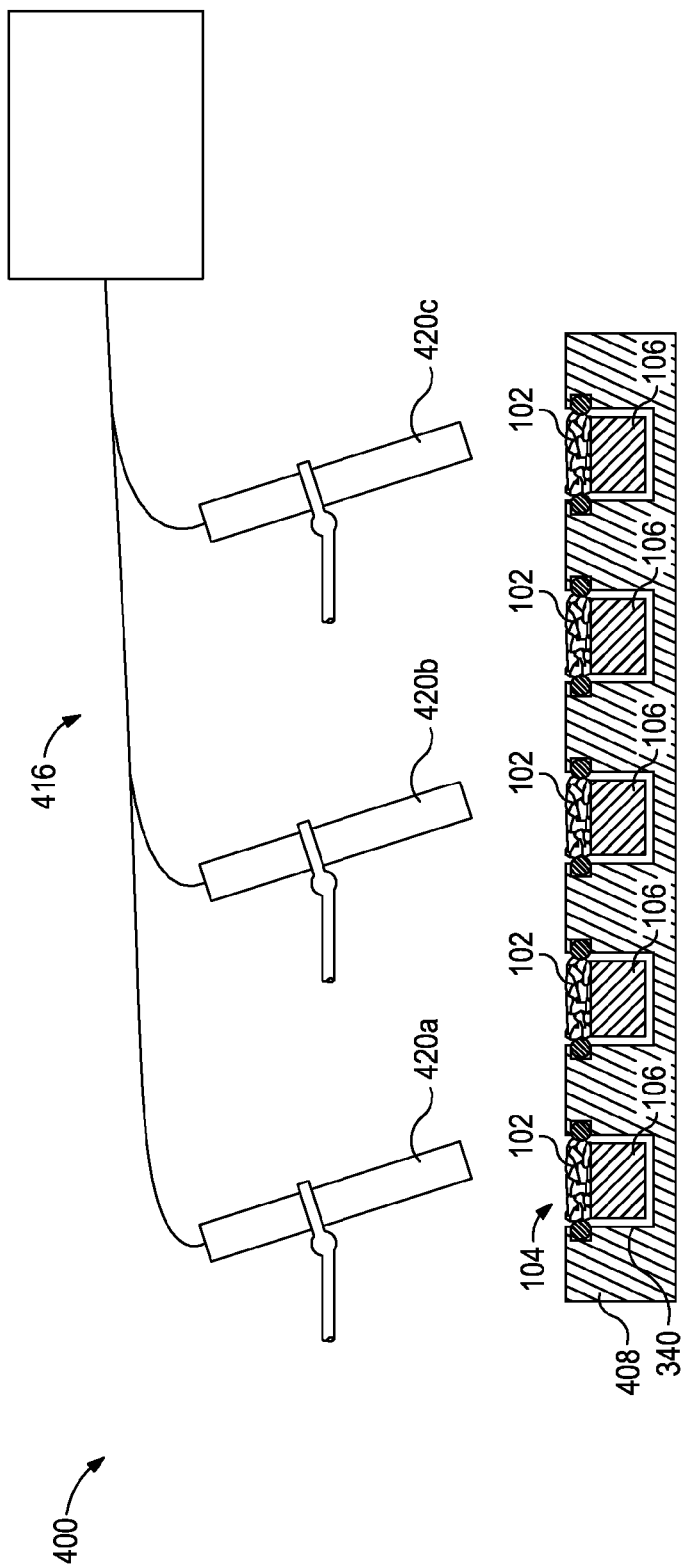
FIG. 6 depicts another exemplary apparatus according to at least some embodiments described herein for leaching catalysts from a PDC disposed on a substrate.

Referring now to FIG. 6, with continued reference to the prior figures, illustrated is another apparatus 400, according to at least some embodiments described herein, for leaching catalysts 102 from a PDC 104 disposed on a substrate 106. More particularly, the apparatus 400 may include a jet system 416, multiple nozzles 420a, 420b, and 420c for treating multiple substrates 106 with PDC 104 disposed thereon and sealed in a liner 408 with multiple slots 340. In some instances, the multiple nozzles 420a-c may translate independently relative to the liner 408. In some instances, the multiple nozzles 420a-c may translate in tandem relative to the liner 408. In some instances, the leaching fluid, the leaching fluid temperature, the jet pressures, jet speeds, etc. used in each of the multiple nozzles 420a-c may be chosen independently. For example, each of the multiple nozzles 420a-c may use the same leaching fluid but each at different pressures. In another example, a first nozzle 420a may use a first leaching fluid (e.g., aqua regia), and a second nozzle 420b may use a second leaching fluid (e.g., nitric acid).

Referring now to FIG. 7, with continued reference to the prior figures, illustrated is another apparatus 500, according to at least some embodiments described herein, for leaching catalysts 102 from a PDC 104 disposed on a substrate 106. More particularly, the apparatus 500 may include a pressure chamber 542 that contains a portion of the apparatus 500 (e.g., at least the nozzle tip 230 and the portions of the liner 108 and sealing element 110 necessary to allow access to the surface of the PDC 104). In the illustrated embodiment, the pressure chamber 542 contains the liner 108, sealing element 110, nozzle 120, and the positioning element 126. The pressure chamber 542 includes a body 544 and an inner covering 546 that is preferably chemically resistant to the leaching fluid. In some instances, the inner covering 546 may be a coating on the interior of the body 544. In some instances, the inner covering 546 may be an insert that is received by or within the body 544.

In some instances, the pressure chamber 542 may be configured for circulating (e.g., recycling) the leaching fluid. As illustrated, the pressure chamber 542 includes two ports 548, 550 in the body 544 and the inner covering 546 that allow for passing tubing therethrough and maintaining the pressure in the pressure chamber 542. For example, the hose 124, which fluidly couples the nozzle 120 and the fluid handling system 122, may pass through the first port 548, and a drain tubing may pass through the second port 550. Optionally, the drain tubing may be fluidly connected to the fluid handling system 122 for recycling the leaching fluid.

In some embodiments, the air pressure in the pressure chamber 542 may be maintained at 20 psi to 5000 psi, or 20 psi to 1500 psi, or 20 psi to 500 psi, including any subset therebetween. Accordingly, in some embodiments where the temperature of the leaching fluid is elevated, the temperature may range between room temperature and the boiling point of the leaching fluid for the air pressure within the pressure chamber 542.

Embodiments disclosed herein include Embodiment A, Embodiment B, and Embodiment C.

Embodiment A

A method that includes impinging a jet of leaching fluid, including one or both of an acid and a caustic material, on a surface of a PDC disposed on a substrate at a fluid pressure between 125 psi and 10,000 psi.

Embodiment A may have one or more of the following additional elements in any combination: Element A1: impinging the jet on the surface of the PDC at a speed of 150 ft/s or greater; Element A2: impinging the jet on the surface of the PDC at an angle of between 30° and 80° relative to the surface of the PDC; Element A3: providing the leaching fluid with a viscosity of between 0.5 cP and 20 cP; Element A4: providing the leaching fluid at a temperature of between room temperature and a boiling point of the leaching fluid; Element A5: introducing cavitation into the jet; Element A6: submerging the surface of the PDC in a fluid; Element A7: Element A6 including providing the fluid in which the PDC is submerged includes the leaching fluid; Element A8: Element A7 including cycling the fluid through a fluid handling system of a jet system that produces the jet; Element A9: generating the jet with a nozzle having a nozzle tip; and submerging the surface of the PDC and the nozzle tip in a fluid; Element A10: generating the jet with a nozzle having a nozzle tip and jet orifice that has a nozzle orifice diameter and is defined in the nozzle tip; and arranging the nozzle tip within twenty nozzle orifice diameters of the surface of the PDC; and Element A11: providing an air pressure greater than atmospheric pressure around the surface of the PDC and the jet.

By way of non-limiting example, exemplary combinations applicable to Embodiment A include: combinations of two or more of Elements A1-A4 and optionally in further combination with one or more of Elements A5-A11; Element A10 in combination with Element A11 and optionally in further combination with one or more of Elements A1-A4; Element A10 in combination with one or more of Elements A1-A4; Element A11 in combination with one or more of Elements A1-A4; Element A10 in combination with Element A11 and optionally in further combination with one or more of Elements A5-A9; Element A1 in combination with one or more of Elements A5-A9; Element A2 in combination with one or more of Elements A5-A9; Element A3 in combination with one or more of Elements A5-A9; Element A4 in combination with one or more of Elements A5-A9; Element A10 in combination with one or more of Elements A5-A9; Element A11 in combination with one or more of Elements A5-A9; and Element A6 in combination with Element A9 and optionally in further combination with one or more of Elements A7-A8.

Embodiment B

A method that includes impinging a jet of leaching fluid, including one or both of an acid and a caustic material, on a surface of a PDC disposed on a substrate at a speed of 150 ft/s or greater.

Embodiment B may have one or more of the following additional elements in any combination: Element B1: impinging the jet on the surface of the PDC at an angle of between 30° and 80° relative to the surface of the PDC; Element B2: providing the leaching fluid with a viscosity of between 0.5 cP and 20 cP; Element B3: providing the leaching fluid at a temperature of between room temperature and a boiling point of the leaching fluid; Element B4: introducing cavitation into the jet; Element B5: submerging the surface of the PDC in a fluid; Element B6: Element B5 including providing the fluid in which the PDC is submerged includes the leaching fluid; Element B7: Element B6 including cycling the fluid through a fluid handling system of a jet system that produces the jet; Element B8: generating the jet with a nozzle having a nozzle tip; and submerging the surface of the PDC and the nozzle tip in a fluid; Element B9: generating the jet with a nozzle having a nozzle tip and jet orifice that has a nozzle orifice diameter and is defined in the nozzle tip; and arranging the nozzle tip within twenty nozzle orifice diameters of the surface of the PDC; and Element B10: providing an air pressure greater than atmospheric pressure around the surface of the PDC and the jet.

By way of non-limiting example, exemplary combinations applicable to Embodiment B include: combinations of two or more of Elements B1-B3 and optionally in further combination with one or more of Elements B4-B10; Element B9 in combination with Element B10 and optionally in further combination with one or more of Elements B1-B3; Element B9 in combination with one or more of Elements B1-B3; Element B10 in combination with one or more of Elements B1-B3; Element B9 in combination with Element B10 and optionally in further combination with one or more of Elements B4-B8; Element B1 in combination with one or more of Elements B4-B8; Element B2 in combination with one or more of Elements B4-B8; Element B3 in combination with one or more of Elements B4-B8; Element B9 in combination with one or more of Elements B4-B8; Element B10 in combination with one or more of Elements B4-B8; and Element B5 in combination with Element B8 and optionally in further combination with one or more of Elements B6-B7.

Embodiment C

An apparatus that includes a liner dimensioned to receive a substrate having a polycrystalline diamond compact (PDC) disposed thereon; a sealing element coupled to the liner to seal the substrate within the liner and expose a surface of the PDC to an environment exterior to the liner; and a jet system that includes a nozzle coupled to a fluid handling system, the nozzle being adaptable to produce a jet of leaching fluid that includes one or both of an acid and a caustic material at a fluid pressure ranging between 125 psi and 10,000 psi.

Embodiment C may have one or more of the following additional elements in any combination: Element C1: the apparatus further including a turntable coupled to the liner and supporting the substrate; Element C2: the apparatus further including a vessel having a fluid disposed therein and having the liner, the substrate, and the PDC disposed therein and submerged within the fluid; Element C3: Element C2 and the a nozzle tip of the nozzle is submerged in the fluid; Element C4: Element C2 further including a fluid connection coupled to the fluid handling for receiving the fluid from the vessel; Element C5: the apparatus further including a pressure chamber containing a portion of the liner and an orifice of the nozzle; Element C6: the apparatus further including a heater with the fluid handling system to regulate a temperature of the leaching fluid; Element C7: the apparatus further including further including a positioning element coupled to a portion of the jet system and used to position the nozzle relative to the surface of the PDC; and Element C8: the nozzle being adaptable to produce the jet of leaching fluid is further adapted to introduce cavitation into the jet of leaching fluid.

By way of non-limiting example, exemplary combinations applicable to Embodiment A include: combinations of two or more of Elements C5-C8 and optionally in further combination with one or more of Elements C1-C4; Element C1 in combination with Element C2 and optionally in further combination with one or more of Elements C3-C4; Element C1 in combination with one or more of Elements C5-C8; and Element C1 in combination with one or more of Elements C5-C8 and optionally in further combination with one or more of Elements C3-C4.

One or more illustrative embodiments incorporating the embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having the benefit of this disclosure.

While compositions and methods are described herein in terms of "comprising" various components or steps, the compositions and methods can also "consist essentially of" or "consist of" the various components and steps.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from a to b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
impinging a jet of leaching fluid, including one or both of an acid or a caustic material, on a surface of a polycrystalline diamond compact (PDC) disposed on a substrate, wherein the jet of leaching fluid comprises a fluid pressure between 125 psi and 10,000 psi and the jet of leaching fluid comprises a speed of 150 ft/s or greater.

2. The method of claim 1 further comprising:
impinging the jet on the surface of the PDC at an angle of between 30° and 80° relative to the surface of the PDC.

3. The method of claim 1 further comprising:
providing the leaching fluid with a viscosity of between 0.5 cP and 20 cP.

4. The method of claim 1 further comprising:
providing the leaching fluid at a temperature of between room temperature and a boiling point of the leaching fluid.

5. The method of claim 1 further comprising:
introducing cavitation into the jet.

6. The method of claim 1 further comprising:
submerging the surface of the PDC in a fluid.

7. The method of claim 6 further comprising:
providing the fluid in which the PDC is submerged includes the leaching fluid.

8. The method of claim 7 further comprising:
cycling the fluid through a fluid handling system of a jet system that produces the jet.

9. The method of claim 1 further comprising:
generating the jet with a nozzle having a nozzle tip; and submerging the surface of the PDC and the nozzle tip in a fluid.

10. The method of claim 1 further comprising:
generating the jet with a nozzle having a nozzle tip and jet orifice that has a nozzle orifice diameter and is defined in the nozzle tip; and
arranging the nozzle tip within twenty nozzle orifice diameters of the surface of the PDC.

11. The method of claim 1 further comprising:
providing an air pressure greater than atmospheric pressure around the surface of the PDC and the jet.

12. A method comprising:
impinging a jet of leaching fluid, including one or both of an acid or a caustic material, on a surface of a polycrystalline diamond compact (PDC) disposed on a substrate, wherein the jet of leaching fluid comprises a speed of 150 ft/s or greater.

13. A method comprising:
impinging a jet of leaching fluid, including one or both of an acid or a caustic material, on a surface of a polycrystalline diamond compact (PDC) disposed on a substrate, wherein the jet of leaching fluid comprises a fluid pressure between 125 psi and 10,000 psi;
generating the jet with a nozzle having a nozzle tip; and
submerging the surface of the PDC and the nozzle tip in a fluid.

14. The method of claim 13 further comprising:
impinging the jet on the surface of the PDC at an angle of between 30° and 80° relative to the surface of the PDC.

15. The method of claim 13 further comprising:
providing the leaching fluid with a viscosity of between 0.5 cP and 20 cP.

16. The method of claim 13 further comprising:
providing the leaching fluid at a temperature of between room temperature and a boiling point of the leaching fluid.

17. The method of claim 13 further comprising:
introducing cavitation into the jet.

18. The method of claim 13 further comprising:
providing an air pressure greater than atmospheric pressure around the surface of the PDC and the jet.

* * * * *